United States Patent

[11] 3,624,495

[72] Inventor Richard Freund
 273 Lawton Ave., Cliffside Park, N.J. 07010
[21] Appl. No. 887,911
[22] Filed Dec. 24, 1969
[45] Patented Nov. 30, 1971

[54] ELECTRICAL BRIDGE CIRCUIT FOR MEASURING A PARAMETER OF AN ELECTRICAL ELEMENT
6 Claims, 3 Drawing Figs.

[52] U.S. Cl. .................................................. 324/62 R
[51] Int. Cl. ..................................................... G01n 27/02
[50] Field of Search ........................................ 324/57, 60, 62

[56] References Cited
UNITED STATES PATENTS

| | | | |
|---|---|---|---|
| 2,132,214 | 10/1938 | Myers............................ | 324/62 |
| 2,625,587 | 1/1953 | Kempf........................... | 324/57 |
| 3,065,414 | 11/1962 | Sears et al...................... | 324/62 |
| 3,195,045 | 7/1965 | Ward.............................. | 324/62 |
| 3,209,908 | 10/1965 | Hopkins ........................ | 324/57 X |

Primary Examiner—Edward E. Kubasiewicz
Attorney—Laurence B. Dodds

ABSTRACT: An electrical bridge circuit for measuring a given parameter of an electrical element such as a resistor, inductor, or capacitor comprises a pair of power-supply input terminals and a first pair of bridge arms connected across the input terminals to establish a point of fixed intermediate potential. The bridge circuit further includes a second pair of bridge arms connected in series across the terminals, the first arm initially effectively including only terminals for connection to the electrical element to be measured. A control circuit is connected between the point of intermediate potential and the junction of the first and second arms. The bridge circuit includes a series of reference electrical elements having parameters of the type to be measured, for example resistance, of values progressing in approximately a geometric series, and the second bridge arm initially includes a plurality of such reference elements having a total parametric value greater than the largest value to be measured. The circuit further includes means responsive to an electrical output of the control circuit of only a given polarity for sequentially and selectively including in the second bridge arm reference elements of alternate parametric values in the series, commencing with the reference element of highest parametric value, and for selectively including one or more of the other reference elements in the first bridge arm, thereby progressively to reduce the arithmetic difference between the total parametric values of the electrical elements in the two bridge arms. The means for changing the circuit relationships of the reference elements as described includes a plurality of switching relays individually connected to switch the reference elements in or out of one or the other of the bridge arms, a selector switch effective to energize the relays in sequence, a plurality of holding relays for individually maintaining their energization and the energization of the switching relays, and a second selector switch effective to energize the holding relays in sequence.

ELECTRICAL BRIDGE CIRCUIT FOR MEASURING A PARAMETER OF AN ELECTRICAL ELEMENT

BACKGROUND OF THE INVENTION

The invention is of general application in the measurement of the value of electrical impedance elements such as resistors, capacitors, and inductors and is particularly suitable to the measurement of the values of such elements over a very wide range of values for a given number of reference elements.

The most usual instrument for measuring impedance elements varying over a wide range of values is a Wheatstone bridge in which the element of unknown value is included in one arm and a so-called decade impedance box or its equivalent in another arm. Such a decade box usually comprises nine impedance elements for each digit of the maximum value to be measured and each impedance element is necessarily a high-precision and, therefore, costly device. For example, to measure an unknown resistance of a value up to 999 ohms, 27 precision resistors are required. The same would be true for a corresponding measurement of capacitors or inductors.

Moreover, such measuring instruments of the prior art as described have, in general required selection of an impedance of the proper value in each of the digital positions and therefore have been relatively time consuming.

It is an object of the invention, therefore, to provide an electrical bridge circuit by means of which precision measurements may be made of electrical impedance elements within a wide range of values and requiring a minimum number of precision reference elements which is only a fraction of the number required in instruments using decade boxes or equivalent.

SUMMARY OF THE INVENTION

In accordance with the invention, there is provided an electrical bridge circuit for measuring a given parameter of an electrical element comprising a pair further power-supply input terminals, means for establishing a point of intermediate potential fixed in relation to that across the input terminals, and first and second bridge arms connected in series across the input terminals, the first arm initially effectively including only terminals for connection to the electrical element to be measured. The measuring circuit further comprises a control circuit connected between the point of intermediate potential and the junction of the first and second bridge arms and a series of reference electrical elements having parameters of the type to be measured of values progressively increasing in a predetermined regular order, the second bridge arm initially including a plurality of such reference elements having a total parametric value greater than the largest value to be measured and predetermined ones of such reference elements being includable in the first bridge arm. Means responsive to an electrical output of the control circuit of only a given polarity is effective for effectively removing reference elements from the second bridge arm and including such predetermined ones of such reference elements in the first bridge arm in sequence in the order of decreasing parametric values, progressively to reduce the arithmetic difference between the total parametric values of the electrical elements in the two bridge arms. The phrase "progressively increasing in a predetermined regular order " is used herein and in the appended claims to include a geometric series or such a series in which the largest numbers are rounded off as well as a hybrid series such as the decimal series 1, 3, 5, 10, 30, 50 ... which, by either addition or subtraction of reference elements, provides information for operation of a continuous decimal counter or count storage in a register.

For a better understanding of the present invention, together with other and further objects thereof, reference is had to the following description, taken in connection with the accompanying drawings, while its scope will be pointed out in the appended claims.

BRIEF DESCRIPTION OF THE DRAWINGS

FIG. 2 is a circuit diagram, partly schematic, of a modified form of bridge circuit, less the control circuit, for measurement of the values of electrical capacitors, while

DESCRIPTION OF THE PREFERRED EMBODIMENTS OF THE INVENTION

Figure 1:
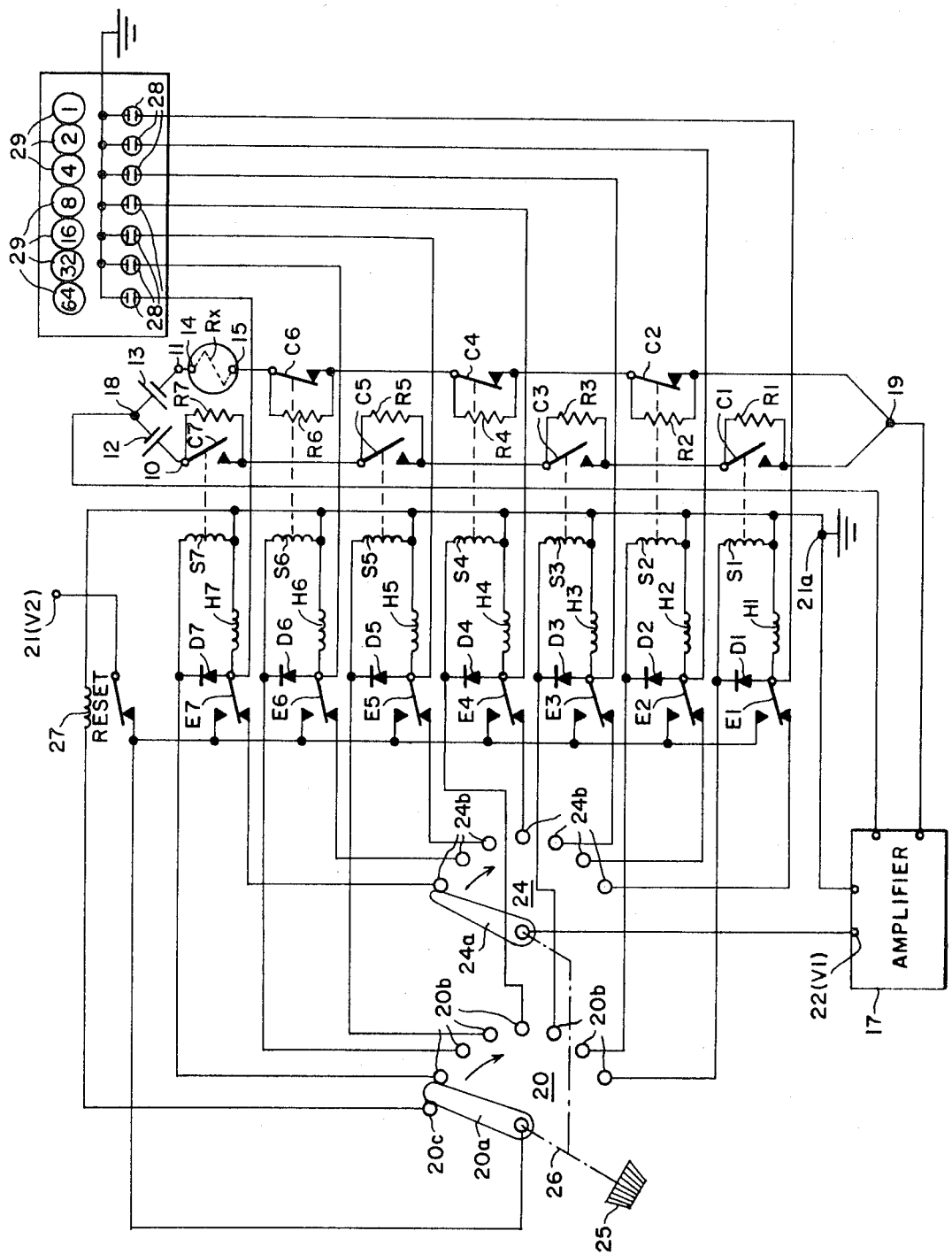
FIG. 1 is a circuit diagram, partly schematic, of an electrical bridge circuit embodying the invention for measurement of electrical resistors of unknown values.

Referring now to FIG. 1, there is represented an electrical bridge circuit embodying the invention for measuring a given parameter of an electrical element, specifically the electrical resistance of a resistor, comprising a pair of power-supply input terminals 10,11 and means for establishing a point of intermediate potential 18 fixed in relation to that across the input terminals 10,11, shown conventionally as a pair of bridge arms comprising batteries 12,13 connected in series between the terminals 10,11.

The bridge circuit further comprises a second pair of bridge arms connected in series across the terminals 10,11, the first arm of such pair effectively initially including only terminals 14,15 for connection to a resistor $R_x$ to be measured, shown in dotted lines since, of course, it forms no part of the measuring instrument itself. The bridge circuit of the invention further comprises a control circuit, specifically a signal amplifier 17 connected between the point 18 of intermediate potential and the junction 19 of the pair of bridge arms. The amplifier 17 is designed to respond to and amplify only a positive control signal from the terminals 18,19.

The bridge circuit further comprises a series of reference electrical elements or resistors having resistance values progressively increasing in a predetermined regular order without duplication of any value. In the specific embodiment of FIG. 1, the values of the resistors progress in a 2:1 geometric series and are identified as R1, R2, R3, R4, R5, R6, and R7. One arm of the bridge, termed the reference arm, includes resistors R1, R3, R5, and R7. The other arm of the bridge, termed the measurement arm, includes the resistor $R_x$ and the resistors R2, R4, and R6, which are initially out of the bridge circuit, as indicated. The aggregate value of the resistors in the reference arm of the bridge circuit is greater than the largest value of the unknown resistor $R_x$ to be measured.

The bridge circuit further comprises means responsive to the electrical output of the control circuit, specifically of the amplifier 17, of only a given polarity for sequentially changing the circuit relationships of the resistors R1–R7 with respect to their respective bridge arms in the order of decreasing resistance values, progressively to reduce the arithmetic difference between the total resistance values of the resistors in each of the two bridge arms. Specifically, there are included a plurality of switching relays S1 to S7, inclusive, and associated normally open switch contacts C1, C3, C5 and C7, which normally connect in series the resistors in the reference arm, and normally closed switch contacts C2, C4, and C6, which normally exclude resistors from the measurement arm.

The bridge circuit of the invention further includes a selector switch 20 effective to energize the relays S1–S7 in reverse numerical sequence. This selector switch comprises a switch arm 20a energized from a suitable input terminal 21 supplying a voltage V2. The selector switch 20 is provided with a series of contacts 20b adapted to be engaged in sequence by arm 20a and individually connected to the relays S1–S7, the circuits of which are completed through ground terminal 21a. The switching relays S1–S7 are provided with holding circuits for the reasons described hereinafter. These holding circuits, comprising holding relays H1 to H7, inclusive, are normally individually connected in parallel with their respective relays S1–S7 through isolating diodes D1–D7, inclusive.

The holding relays H1–H7 are initially energized by means of an auxiliary selector switch 24, similar to the selector switch 20, and comprising a switch arm 24a connected to output terminal 22 of amplifier 17, normally supplying a signal voltage V1, usually substantially less than V2 at terminal 21. The diodes D1-D7 are so poled that current from the high-voltage terminal 21 will not flow therethrough to the low-voltage terminal 22 when connected thereto by way of selector switch 24. They also serve to prevent energization of the holding relays H1-H7 by the initial switching voltage from contacts 20b. The switch 24 is provided with a series of contacts 24b. The switch arms 20a and 24a are in angular alignment, as are the contacts 20b and 24b, although the contact portion of switch arm 20a is substantially wider than that of switch arm 24a for purposes described hereinafter. The contacts 24b are individually connected to control the energization of the holding relays H1-H7. The holding circuits for the switching relays S1-S7 and the holding relays H1-H7 are energized through the switch contacts E1-E7, respectively, in parallel across the supply terminals 22, 21a.

The selector switches 20 and 24 are connected to be driven in common by a manually operated knob 25 and a shaft indicated schematically at 26. Selector switch 20 is also provided with a reset contact 20c connected in circuit with a reset relay 27, having a contact in series with supply terminal 21 and effective, upon energization, to deenergize any of the holding relays H1-H7 and switching relays S1-S7 which may remain energized at the end of the measurement cycle.

Since the values of the resistors R1-R7 are related in a 2:1 or binary series, the final value of the unknown resistor Rx may be indicated by any of several well-known binary counters. However, by way of example, there is illustrated an extremely simple indicating arrangement comprising a series of neon glow lamps 28 individually connected to the holding circuits of the several switching relays, the arrangement being such that each neon lamp is energized only when its associated switching relay is energized. Associated with the neon lamps 28 are a series of windows 29 having numerals 1, 2, 4 ... 64 thereon and arranged to be illuminated by lamps 28. The sum of the illuminated values then represents the decrease from the initial value difference of the reference resistors in the two arms of the bridge.

In describing the operation of the electrical bridge circuit of the invention as described, it will be assumed that the resistors R1-R7 have values in a geometric ratio of 2:1, namely, values of 1, 2, 4, 8, 16, 32, and 64 ohms, respectively. It will also be assumed that the total value of the resistors in the reference bridge arm including resistors R1, R3, R5, and R7 is greater than the largest value of the unknown resistor R to be measured. It will also be assumed, as indicated in FIG. 1, that the contacts C1, C3, C5, and C7 are open so that the resistors R1, R3, R5, and R7 are included in the reference bridge arm and that contacts C2, C4, and C6 are closed, short-circuiting their respective resistors R2, R4, and R6 so that they are effectively out of the measurement bridge arm.

By way of example, the operation of the bridge circuit of the invention will be described for the measurement of a resistor having a value of 19 ohms. Under these conditions, the total value of resistance in the reference bridge arm is 85 ohms, which is in excess of the resistance of Rx in the measuring bridge arm. Upon rotation of the selector switches 20 and 24, initially the switching relay S7 is energized via switch arm 20a and the first contact 20b to short-circuit resistor R7, thereby reducing the total resistance in the reference bridge arm to 21 ohms, which is, however, still larger than the unknown resistor Rx. Therefore, the control signal output of amplifier 17 remains positive and, an instant later when the switch arm 24a engages the first of the contacts 24b, the holding relay H7 is operated, completing a holding circuit for the relays S7 and H7 across the input terminals 22,21a. Therefore when, an instant later, the switch arm 24a disengages the first contact 24b and an instant thereafter the switch arm 20a disengages the first contact 20b, the holding circuit for the relays S7 and H7 is nevertheless maintained, thus maintaining the short circuit around resistor R7. If, on the other hand, the value of the resistor Rx were, say, 33 ohms, then when the resistor R7 was shorted out, as described, the value of the resistance in the reference arm would be less than that in the measuring arm and the control signal from terminals 18,19 would be of negative polarity so that no voltage V1 would be supplied at output terminal 22 of amplifier 17. In such event, as soon as the switch arm 20a disengaged the first contact 20b, the circuit for the switching relay S7 would be deenergized, again opening the contact C7 and reinserting resistor R7 in the measuring arm.

As the switch arm 20a of selector switch 20 engages its second contact 20b, the relay S6 is energized to open contact C6 and thereby insert resistor R6 of 32 ohms in the measuring bridge arm. Under the conditions assumed, the total resistance in the reference arm is now 21 ohms and that in the measuring arm is 51 ohms so that the polarity of the control signal from terminals 18,19 applied to amplifier 17 is negative, no voltage V1 is developed at output terminal 22, and the contact C6 recloses. In a similar manner, the selector relays S5, S4, S3, S2, and S1 are energized through the successive contacts 20b of the selector switch 20 while, shortly following each such energization, the successive contacts 24b test the presence or absence of a control voltage V1 at output terminal 22. In each instance in which the control signal from terminals 18,19 is of positive polarity, indicating that the total resistance in the reference arm is greater than that in the measuring arm, the holding circuit of the last operated switching relay is energized to hold the switching relay in the operated condition while, in each instance in which the control signal from terminals 18,19 is of negative polarity or a null, the respective holding relay and switching relay drop out of their operative positions, opening the respective ones of the contacts C1, C3, C5, and C7 and closing the respective ones of the contacts C2, C4, and C6.

The complete measuring operation can be indicated by the following table, representing conditions at the moment when both switch arms 20a and 24a are simultaneously engaging their respective contacts.

STEPS IN MEASUREMENT OF Rx=19 OHMS

| Step | Contact actuated | Reference arm resistance (ohms) | Measure arm resistance | Control signal V1 | Holding circuits energized |
|---|---|---|---|---|---|
| 1 | C7 | 21 | 19 | + | H7 |
| 2 | C6 | 21 | 51 | 0 | H7 |
| 3 | C5 | 5 | 19 | 0 | H7 |
| 4 | C4 | 21 | 27 | 0 | H7 |
| 5 | C3 | 17 | 19 | 0 | H7 |
| 6 | C2 | 21 | 21 | 0 | H7 |
| 7 | C1 | 20 | 19 | + | H7, H1 |
| Final | | 20 | 19 | | |

After the final switching relay S1 is operated, the resistance values showing through the illuminated windows 29 of the counter are then summed and such sum is subtracted from the total value of the resistors in the reference arm, the difference representing the value of the unknown resistor Rx within the accuracy of measurement. For example, in the measurement cycle represented by the foregoing table, only the 64-ohm and 1-ohm windows will finally be illuminated. Their sum is 65 which, subtracted from the total of 85 ohms in the reference arm, gives 20 ohms as the value of the unknown resistor Rx as indicated in the table.

From the foregoing table, it is seen that measurements of an unknown resistance of a value up to 85 ohms is made with a maximum error of +1 ohm. Greater accuracy can, of course, be obtained by increasing the number of reference resistors. For example, by utilizing eleven resistors having values in the 2:1 geometric series 0.1, 0.2, 0.4 ... 51.2, 102.4, resistors having values in the range up to 136.5 ohms may be measured with an accuracy of +0.1 ohm.

In using reference electrical elements of values in a geometric series as described, the upper limit of the range of measurement usually is an odd decimal value, as in the two foregoing examples. It may therefore be desirable to adjust downward the values of one or two of the highest valued elements to provide a measurement range of a round decimal value. For instance, in the last of the foregoing examples, the value of the highest valued resistor may be reduced from 102.4 to 65.9 to give a range of measurement of 100 ohms. The term "approximate geometric series," as used herein and in the appended claims, is intended to include such a rounding off or hybridization of the strict geometric series.

Figure 2:
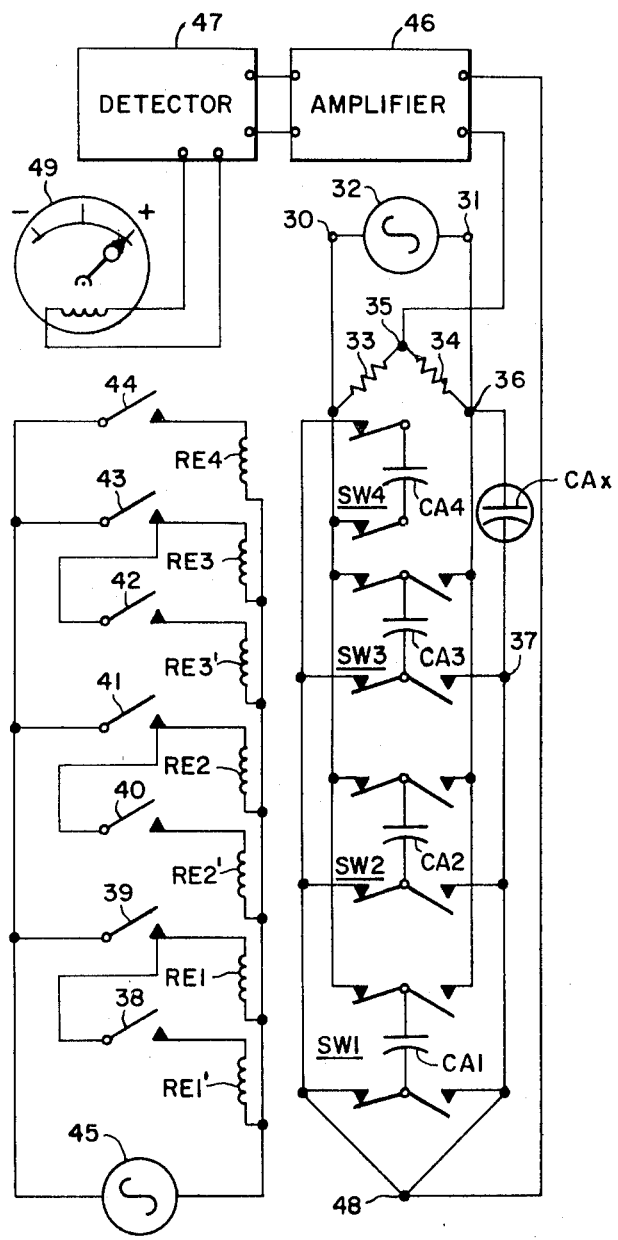

In FIG. 2 is represented a modified form of the invention in which the input terminals are alternating current supply terminals and in which the elements to be measured and the reference elements are reactance elements of the same type, for example capacitors. Further, in the modification of FIG. 2, the reference elements have values forming a 3:1 geometric series. In FIG. 2, only the basic bridge circuit itself is shown although the control circuits for the switching relays may be of the same general form as shown in FIG. 1.

Referring specifically to FIG. 2, there is shown a pair of input terminals 30,31 for connection to an alternating current source 32. A first pair of bridge arms comprising fixed resistors 33 and 34 are connected in series across the terminals 30,31, providing an intermediate point 35 of fixed potential relative to the terminals 30,31. The third or measurement arm of the bridge normally includes terminals 36 and 37 for connection to an unknown capacitor CAx. The bridge circuit also includes a plurality of capacitors CA1–CA4, inclusive, which, by arrangements to be described, may be selectively connected in the measurement arm of the bridge in parallel with capacitor CAx (except CA4); or selectively disconnected from the bridge circuit; or selectively connected in parallel with each other and in series with the capacitor CAx to form the fourth arm of the bridge. Specifically, the capacitor CA1 may be selectively connected in series with capacitor CAx, or disconnected from the bridge circuit, or connected in parallel with capacitor CAx via a double-pole three-position switch SW1, it being shown as being connected in series therewith. Similarly, the capacitors CA2 and CA3 may be selectively connected by means of double-pole three-position switches SW2 and SW3 either in parallel with capacitor CAx, or in parallel with capacitor CA1 or any other selected capacitors of the group, or disconnected from the bridge circuit. Capacitor CA4 may be selectively connected in parallel with the capacitors in the reference arm of the bridge by a double-pole single-throw switch SW4, but is never included in the measurement arm of the bridge.

Each of the switches SW1–SW5 is shown with normally closed left-hand contacts which may be selectively actuated to contact-opening position by the relays RE1–RE4, respectively. Each of the switches SW1–SW3 may be selectively actuated to close its right-hand contacts by relays RE1'–RE3', respectively. Relays RE1–RE4 may be selectively energized by switches 39, 41, 43, and 44, respectively, while relays RE1'–RE3' may be selectively energized by switches 38, 40, and 42, respectively, which are connected in series with switches 39, 41, and 43, respectively. The several relay windings described are energized in parallel through their respective contacts from a source 45 of alternating current.

The unbalance signal developed by the electrical bridge is taken from the point 35 of fixed intermediate potential and the junction point 48 between the reference and measurement arms of the bridge and is applied via an amplifier 46 and a detector 47 to a meter 49 for giving a visual indication of whether the control signal is of positive or negative polarity and, thus, to determine the appropriate operation of each of the switches 38–44. Alternatively, the relays RE1–RE4 and RE1'–RE3' may be controlled automatically by a control circuit similar to that of FIG. 1; likewise, a visual indication of the capacitors in the reference arm and the measuring arm can also be given in a manner similar to that of FIG. 1.

The operation of the electrical bridge circuit of FIG. 2 is similar to that of FIG. 1 explained above except that each capacitor, other than capacitor CA4, is capable of being placed in either the measuring arm or reference arm of the electrical bridge circuit or of being disconnected from the bridge circuit. This arrangement can also be utilized to switch series resistors between the reference and measuring arms of the bridge. This arrangement reduces the number of precision reference elements required, at the expense of slightly more complex switching circuits.

The steps in the measurement of a capacitor of unknown value may be explained with reference to the following table. It is assumed initially that the switches 38–44 are open, the relays RE1–RE4 and RE1'–RE3' are all deenergized, and that switches SW1–SW4 are in the positions shown with their left-hand contacts closed; that the unknown capacitance CAx has a value of 14$\mu f$; and that the reference capacitors CA1–CA4 have values of 1, 3, 9, and 27$\mu f$, respectively, these all being connected in parallel with each other in the reference arm of the bridge circuit and in series with the capacitor CAx in the measurement arm. In operation, each of the switches is operated in succession in the order 44 to 38. If, upon successive closing of each switch, the meter 49 registers a negative unbalance signal from the bridge circuit, that switch is reopened and the next switch closed; if the meter 49 registers a positive signal, the switch is left closed.

STEPS IN MEASUREMENT OF CAx=14$\mu f$,

| Step | Switches closed | Reference arm capacitance (initial 40 $\mu f$,) | Measurement arm capacitance (initial 14 $\mu f$,) | Control signal (+ or −) |
|---|---|---|---|---|
| 1 | 44 | (−27) 13 | 14 | − |
| 2 | 43 | (−9) 31 | 14 | + |
| 3 | 42, 43 | 31 | (+9) 23 | + |
| 4 | 41–43 | (−3) 28 | 23 | + |
| 5 | 40–43 | 28 | (+3) 26 | + |
| 6 | 39–43 | (−1) 27 | 26 | + |
| 7 | 38–43 | 27 | (+1) 27 | Null |

From the foregoing table, it can be seen that at the conclusion of the measurement of the measuring steps, capacitor CA4 is in the reference arm of the bridge and capacitors CA1, CA2, and CA3 are in the measuring arm in parallel with each other and with the unknown capacitor CAx. The difference between the capacitances of the reference capacitors in the two arms is 14$\mu f$, which is the assumed value of the unknown capacitor.

Figure 3:
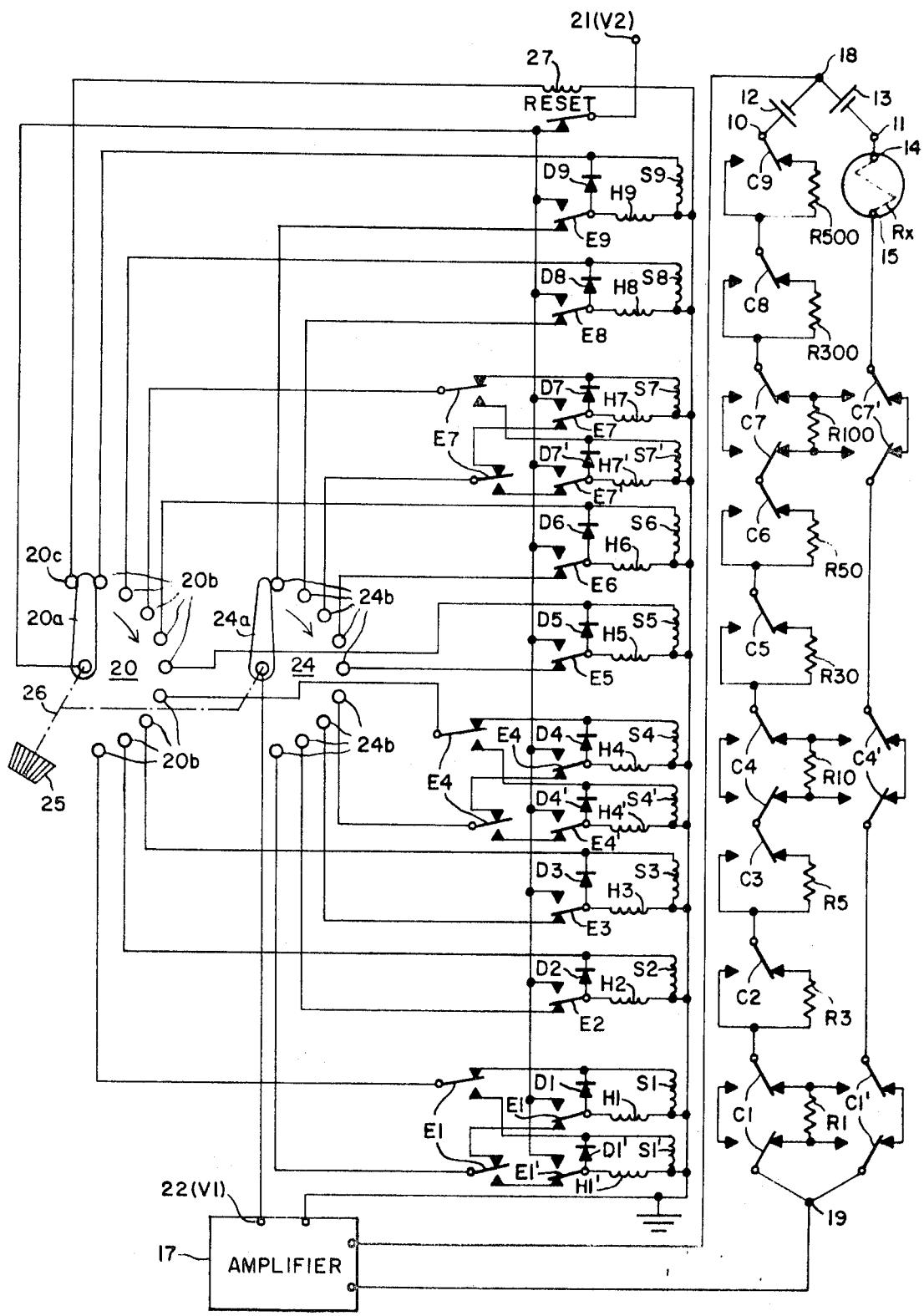
FIG. 3 is a modified form of bridge circuit and control circuit including a hybrid decimal series of reference resistors.

Referring now to FIG. 3 of the drawings, there is shown a modified form of bridge circuit and control utilizing resistances whose values form a hybrid series, for example in the decimal series 1, 3, 5, 10, 30, 50, 100, 300, 500, to afford a measurement of a total of 999 ohms which, by either addition or subtraction of certain reference elements, provides information for operation of a continuous decimal counter. Elements of the system of FIG. 3 corresponding to those of FIG. 1 are identified by the same reference numerals. In addition to the use of resistances the values of which form a hybrid decimal series as noted, the only difference is a modification of the control circuit to enable selective inclusion of the resistors R1, R10, and R100 in either the reference arm or the measurement arm.

Consider specifically the circuit for the control of the R100 resistor unit. Initially, as the switch arm 20a engages the contact 20b connected to the switching relay S7, if the resistance of the reference arm is greater than that of the measurement arm, a positive voltage V1 is developed at terminal 22 of amplifier 17, thus picking up holding relay H7. That relay has auxiliary contacts E7 which are effective to transfer the circuits from the contacts 20b and 24b, then in circuit, to the auxiliary switching relay S7' and holding relay H7'. The relay S7', through contacts C7', then includes the resistor R100 in the measurement arm. If the control signal from the output terminal 22 is still a positive voltage, holding relay H7' is energized, thus maintaining the resistor R100 in the measurement arm. The lower one of the auxiliary contacts E7 of holding relay H7 is designed to operate with a slight delay with respect to the upper contact, as by having a slightly wider gap, to make certain that switching relay S7' is energized to permit the holding relay H7' to sense the bridge signal, which determines whether or not it is to be maintained energized. The same sequence of operations is applied to the resistor units R10 and R1.

In the operation of the system of FIG. 3, as the selector switches 20 and 24 are actuated to engage their several contacts in sequence, the several resistor units R3, R5, R30, R50, etc. are selectively included or excluded from the reference and measurement arms of the bridge in accordance with whether, at each step, a positive control signal is developed at the terminals 18,19 of the bridge to develop a positive voltage at the output terminal 22 of amplifier 17 as in the system of FIG. 1, as modified by the preceding description. The signals representative of whether the several holding relays are or are not energized may be used, as in FIG. 1, to provide an indication of the value of the unknown resistor $R_x$ upon completion of the measurement cycle.

Thus it is seen that the electrical bridge of the invention provides for the measurement of a given parameter of an electrical element of unknown value utilizing a number of reference elements which are only a fraction of those required in conventional decade measuring instruments. A corollary of this feature is that the final measurement may be made more quickly, whether done manually or by automatic instrumentation as in the apparatus of FIG. 1. Furthermore, any error due to contact resistance is substantially reduced because the contact resistances in the two arms at least partially compensate each other.

While there have been described what are, at present, considered to be the preferred embodiments of the invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. An electrical bridge circuit for measuring a given parameter of an electrical element comprising:
   a pair of power-supply input terminals;
   means for establishing a point of intermediate potential fixed in relation to that across said input terminals;
   first and second bridge arms connected in series across said terminals, said first arm initially effectively including only terminals for connection to the electrical element to be measured;
   a control circuit connected between said point of intermediate potential and the junction of said first and second arms;
   a series of reference electrical elements having parameters of the type to be measured of values progressively increasing in a predetermined regular order, said second arm initially including a plurality of said reference elements having a total parametric value greater than the largest value to be measured and predetermined ones of said reference elements being includable in said first arm;
   and means responsive to an electrical output of said control circuit of only a given polarity for effectively removing reference elements from said second arm and including such predetermined ones of said reference elements in said first arm in sequence in the order of decreasing parametric values, progressively to reduce the arithmetical difference between the total parametric values of the electrical elements in said two bridge arms.

2. An electrical bridge circuit in accordance with claim 1 in which the parametric values of said reference elements progress approximately in a 3:1 geometric series.

3. An electrical bridge circuit in accordance with claim 2 in which reference elements of progressively decreasing parametric values are selectively includable in either of said first and second bridge arms.

4. An electrical bridge circuit for measuring a given parameter of an electrical element in accordance with claim 1 in which the reference elements included in said second arm are of alternate parametric values and the reference arms includable in said first arm are of intermediate parametric values.

5. An electrical bridge circuit for measuring a given parameter of an electrical element comprising:
   a pair of power-supply input terminals;
   means for establishing a point of intermediate potential fixed in relation to that across said input terminals;
   first and second bridge arms connected in series across said terminals, said first arm initially effectively including only terminals for connection to the electrical element to be measured;
   a control circuit connected between said point of intermediate potential and the junction of said first and second arms;
   a series of reference electrical elements having parameters of the type to be measured of values progressively increasing in a predetermined regular order, said second arm initially including a plurality of said reference elements permanently connected in series and having a total parametric value greater than the largest value to be measured;
   and means responsive to an electrical output of said control circuit of only a given polarity for short-circuiting said reference elements in said second arm in the order of decreasing parametric values progressively to reduce the arithmetical difference between the total parametric values of the electrical elements in said two bridge arms.

6. An electrical bridge circuit for measuring a given parameter of an electrical element in accordance with claim 5 in which predetermined ones of said reference elements are permanently connected in series in said first arm but normally short-circuited and including means for selectively short-circuiting or removing a short circuit from said reference elements.

* * * * *